(12) United States Patent
Payson

(10) Patent No.: US 8,610,420 B2
(45) Date of Patent: Dec. 17, 2013

(54) SWITCHED AND SMART SWITCHED TRACKING POWER SUPPLY

(75) Inventor: Ellwood Payson, Fullerton, CA (US)

(73) Assignee: ISCB Inc., Costa Mesa, CA (US)

( * ) Notice: Subject to any disclaimer, the term of this patent is extended or adjusted under 35 U.S.C. 154(b) by 316 days.

(21) Appl. No.: 13/098,684

(22) Filed: May 2, 2011

(65) Prior Publication Data

US 2011/0267021 A1    Nov. 3, 2011

Related U.S. Application Data

(60) Provisional application No. 61/343,711, filed on May 3, 2010, provisional application No. 61/343,713, filed on May 3, 2010.

(51) Int. Cl.
*G05F 1/46* (2006.01)
*G05F 1/575* (2006.01)

(52) U.S. Cl.
USPC .......................................................... 323/285

(58) Field of Classification Search
USPC .................................. 323/285, 299, 282, 283
See application file for complete search history.

(56) References Cited

U.S. PATENT DOCUMENTS 4,618,812 A * 10/1986 Kawakami ..................... 323/224
4,672,303 A * 6/1987 Newton ........................ 323/285
8,085,024 B2 * 12/2011 Prodic et al. .................. 323/283

* cited by examiner

*Primary Examiner* — Gary L Laxton
(74) *Attorney, Agent, or Firm* — W. Eric Boyd, Esq.

(57) ABSTRACT

A switched tracking power supply that modifies its output based on input power source characteristics. A power source is input into the switching power supply. A plurality of gain networks and feedback paths from a reference voltage of the switching power supply are used to monitor the input power source and to modify the output voltage based on characteristics of the input power source.

2 Claims, 4 Drawing Sheets

US 8,610,420 B2

SWITCHED AND SMART SWITCHED TRACKING POWER SUPPLY

CROSS-REFERENCE TO RELATED APPLICATIONS

This application claims the benefit of U.S. Provisional Patent Application No. 61/343,711, filed on May 3, 2010, entitled "Smart Switched Tracking Power Supply" and U.S. Provisional Patent Application No. 61/343,713, filed on May 3, 2010, entitled "Switched Tracking Power Supply", pursuant to 35 USC 119, which applications are incorporated fully herein by reference.

STATEMENT REGARDING FEDERALLY SPONSORED RESEARCH AND DEVELOPMENT

N/A

BACKGROUND OF THE INVENTION

1. Field of the Invention

The invention generally relates to the field of electronic power supplies.

More specifically, the invention relates to a switched and a smart switched tracking power supply that characterizes one or more predetermined electrical source characteristics of an input power source and modifies the characteristics of the output power supply based on the predetermined characteristics of the input source.

2. Description of the Related Art

Many existing electronic power supplies or power sources have output characteristics that vary over time and operating parameters. It is also common that electronic loads operating from these power sources monitor the power source output and perform housekeeping functions based on the source characteristics.

This invention herein implements circuitry in the form of a switched and a smart switched tracking power supply that permits the exchanging of a first power (e.g., originally used) source with a second power source that can supply an electronic load with a signal representative of the first power source. The input/output control parameters of the circuit of the invention may be parameters relating to power, voltage or current or a combination thereof.

As is known in electrical design arts, design tradeoffs exist between power source parameters such as power, size, output response characteristics, discharge curves, and costs. Design options may be limited whenever a substitute power source of different characteristics is needed.

Existing technology frequently utilizes a switching power supply to convert an input power source to an output power source of a different voltage. The invention implements circuitry that monitors the input power source of a switching power supply and modifies the output thereof based on the characteristics of the input source. The invention can be used to take advantage of numerous prior art switching power supply devices or can be implemented in the form of a discrete standalone switching power supply.

By way of example power sources such as batteries, photovoltaic or thermopile devices are well-suited to take advantage of the power supply circuit of the invention.

A need exists for the output voltage of a switching type power supply to track the drop-in input voltage. As an example, portable devices exist where a first battery or power source with a first voltage or electronic characteristic must be substituted for a second battery source having a different voltage or electronic characteristic. In such instances, the load electronics may be "modeled" after the original source using the circuit of the invention which performs power management and source characterization functions based on the discharge voltage curve of the original source.

BRIEF SUMMARY OF THE INVENTION

The invention comprises circuitry that monitors an input power source and modifies the output based on the characteristics of the input source. A first power source is input into a switching power supply. A plurality of gain networks and feedback paths from Vref of the switching power supply are in connection with the inputs and outputs of the switching power supply whereby the invention is configured to monitor the input power source and modify the output based on the characteristics of the input source.

In one embodiment, a smart controller monitors the discharge curve of a first power source and translates the output to emulate the discharge curve of a second power source.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Figure 1:
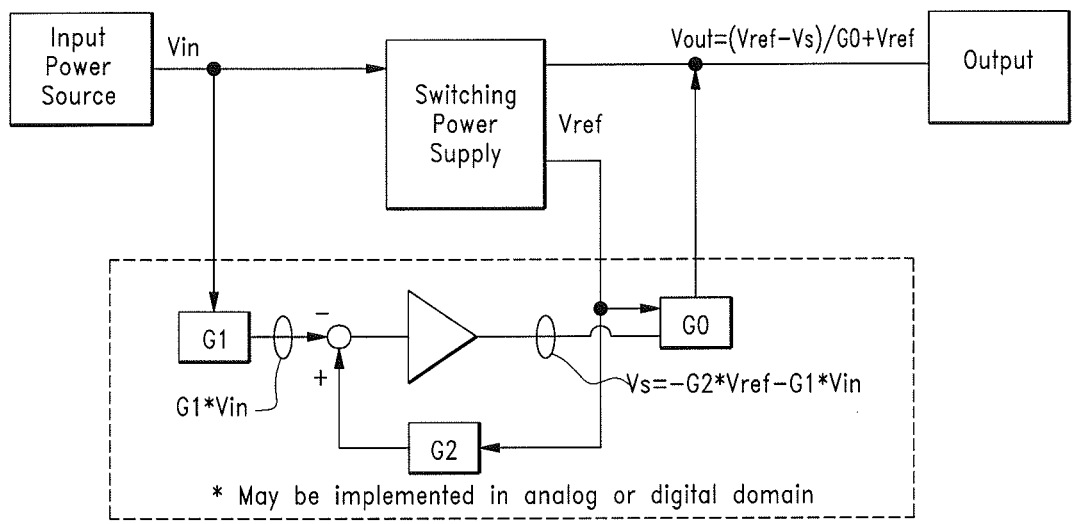
FIG. 1 is block diagram of a preferred embodiment of the switched tracking power supply of the invention.
Figure 3:
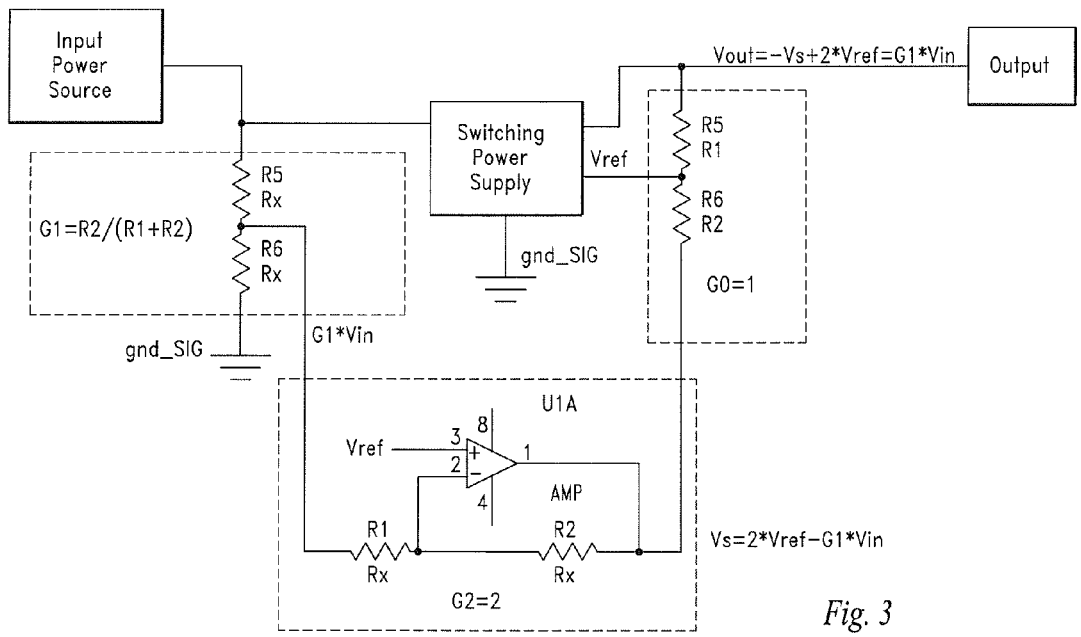
FIG. 3 is block diagram of a preferred embodiment of the smart switched tracking power supply of the invention.

Turning now to the figures wherein like references define like elements among the several views, FIG. 1 and FIG. 3 show a block diagram and a schematic exemplar block diagram, respectively, of a preferred embodiment of the switched tracking power supply of the invention.

Figure 2:
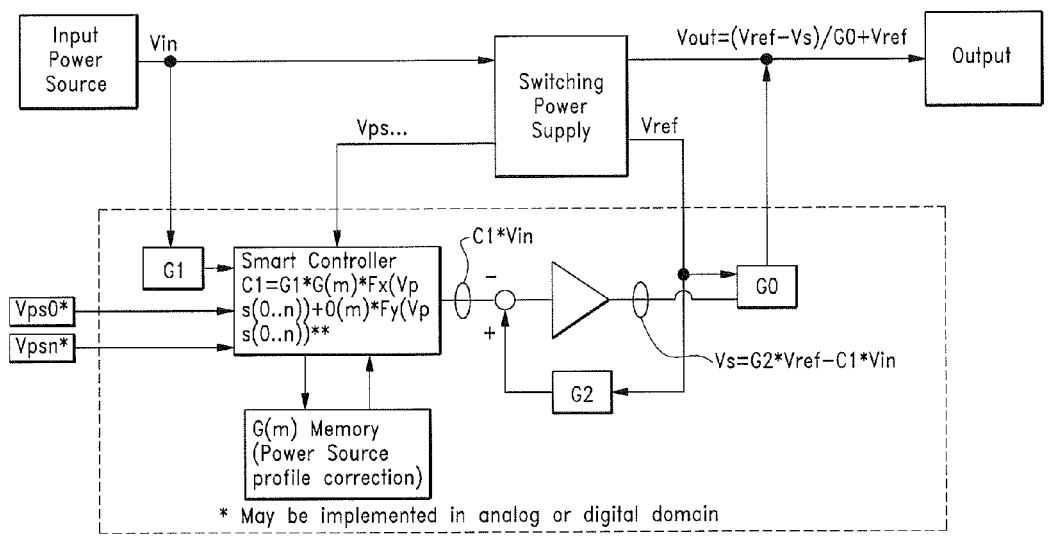
FIG. 2 is schematic diagram of an exemplary preferred embodiment of the switched tracking power supply of the invention.
Figure 4:
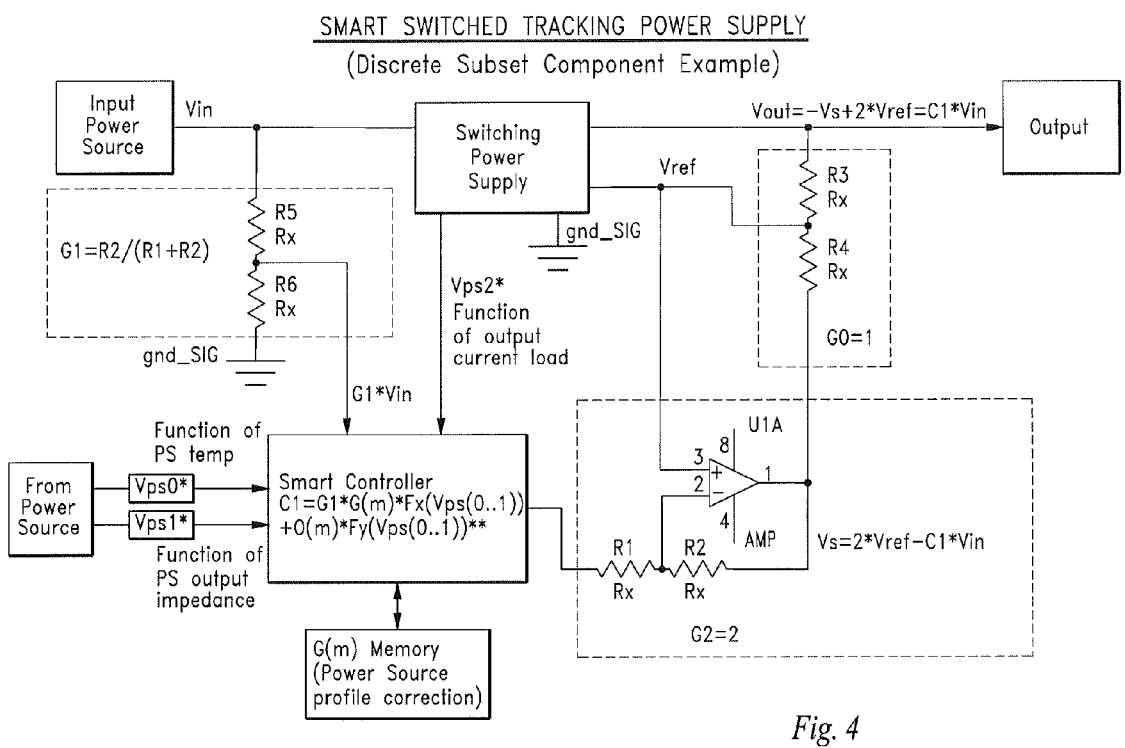
FIG. 4 is schematic diagram of an exemplar preferred embodiment of the smart switched tracking power supply of the invention.

FIG. 2 and FIG. 4 show a block diagram and a schematic exemplar block diagram, respectively, of an alternative preferred embodiment illustrating a smart switched tracking power supply of the invention.

In cases requiring voltage monitoring and control, the switched tracking power supply output voltage permits proportional tracking of the input source voltage for a source of similar electrical characteristics such as by implementing a buck switching controller whereby the switched tracking power supply permits two or more batteries to be placed in series (e.g. doubling the voltage) while the electronic load "sees" the substitute source as if it were a single battery.

As a further example, by implementing a boost switching controller, the switched tracking power supply circuitry permits any number of batteries that are in series to be reduced in number (e.g., halving the input voltage), yet the electronic load sees the source as if it were a multiple battery.

As yet a further example, by implementing a buck/boost switching controller, the switched tracking power supply circuitry permits one or more batteries to function above or below an output characterized battery, resulting in extending the operational life of the electronics and thereby avoiding the limitations of the power source. This eliminates the need to replace or modify hardware when input circuitry would be electronically stressed due to a substitute power source output exceeding the electronic load circuit's input specification. The circuit further serves to eliminate the need for firmware modification when a power source with new linear characteristics is installed.

With respect to FIGS. 1 and 3, a switched tracking power supply is disclosed that provides the ability to substitute or replace a first power source having a first set of electrical characteristics such as photovoltaic cell, thermopile or battery source, with a second power source having differing second set of electrical characteristics. Such an instance may, for example comprise adding/removing one or more power source components (e.g., batteries) either in parallel or series, or by substituting power source components having chemistry/technology differing from the first power source.

The circuitry of the invention permits the substitution of differing input power sources having varying output characteristics without affecting existing input power signal housekeeping power management circuitry functions and without compromising system efficiency.

Exchanging or substituting power sources in existing circuitry requires consideration of a number of parameters such as the similarity of the second source output voltage to the first source output voltage, whether the new source is capable of supplying the necessary voltage to drive the load electronics, whether the new source can supply the necessary current to drive the load electronics, how the current draw/voltage of the new source changes over time and operating conditions, whether the load electronics monitors the input power source voltage, current or power and whether it performs any power management housekeeping based on that voltage, current or power. Additionally, once a power source is changed, there may be a need to not only re-adjust the power source output but also to track any changes (e.g. battery voltage discharge) of the source.

The switched tracking power supply of FIGS. 1 and 3 proportionally images the switched power supply output to reflect changes at the switching input. A specific application example is the need to add batteries in serial, thus increasing the available energy (run-time) to the load, but at the same time keeping the voltage and output voltage variations seen by the load as if it were one battery.

A design consideration is the selection of the proper feedback gain components to allow proportional reduction or increase of the output switcher voltage tracking the input power supply voltage. In this case Vref, typically available from many variable output switched IC devices, is used by the internal switcher circuitry to control PWM duty cycle and thus the output power supply voltage control point. An additional voltage (Vs) derived from the power supply input source may be summed with this Vref control signal to additionally vary to the output voltage control point by:

$$Vout=(Vref-Vs)/G0+Vref \qquad \text{Equ. 1}$$

Vs is defined as a G2 gain addition of the Vref signal and a G1 gain of the input power supply voltage (Vin) by:

$$Vs=-G1*Vin+G2*Vref \qquad \text{Equ. 2}$$

By substituting Equ. 2 into Equ. 1, one obtains:

$$Vout=Vref*(1+1/G0-G2/G0)+G1/G0*Vin) \qquad \text{Equ. 3}$$

Substitute G0=1 and G2=2
Yields Vout=G1*Vin

Thus, the output of the switched tracking power supply is able to modify the switched supply Vout proportional to the G1 gain component.

In the switched tracking power supply of FIG. 1 and the exemplar embodiment of FIG. 3, a switching power supply is provided having a Vin, a Vref and a Vout. An input power source is in electrical connection with Vin and with the output of a first gain function circuit having a gain function G1.

Vref is in electrical connection with a first input of a second gain function circuit having a gain function G2 and in connection with the input of a third gain function circuit having a gain function G0.

The output of the first gain function circuit is in electrical connection with the output of the second gain function circuit whereby the respective outputs are summed to define a second input to the third gain circuit wherein the second input is Vs=G2*Vref−G1*Vin.

The output of the third gain function circuit is in electrical connection with the switching power component output to define Vout where Vout=(Vref−Vs)/G0+Vref.

By implementing a buck switching controller, the switched tracking power supply allows batteries to be placed in series (e.g., doubling the voltage) yet the electronic load will see the source as if it were a single battery.

By implementing a boost switching controller, the switched tracking power supply circuitry allows applications where batteries are used in series to be reduced in number (e.g., halving the input voltage) yet the electronic load will see the source as if it were a multiple battery set.

If the switched tracking power supply invention is implemented in an analog circuit embodiment, the existing switching power supply may comprise an amplifier device to separately sum the switching device voltage reference with the input power source signal. The analog embodiment may comprise at least one amplifier (e.g. operational amplifier) and one or more filtering and gain determining passive components.

A digital implementation of the switched tracking power supply of the invention may use digital conversion of the input power signal with the switching power supply reference signal. The gain, offset and summing calculations may be performed internal to the circuit using for instance, a CPLS, FPGA, DSP or a microcontroller. The digital embodiment may also be implemented in combination with a user-defined number of elements of the analog implementation. The digital hardware implementation may use one or more D-A converters, one or more A-D converters and support passive components.

No firmware support is required for the fully analog implementation. Firmware support is preferably implemented in the digital embodiment to perform gain and offset functions, and output analog conversion.

An alternative embodiment comprises a smart switched tracking power supply that permits a first input power source to be replaced with a second input power source yet supply the electronic load with a signal representative of the original first power source.

The input/output control parameters may be one of power, voltage or current; any or all of which may be compared to a pre-stored, digitized input power source profile to control the smart switched tracking power supply output signal. This permits power sources having different performance characteristics to be interchangeable and the expansion of applications for existing circuitry that were previously limited by power source limitations without modification to existing circuitry.

Additionally, the smart switched tracking power supply of the invention eliminates the need to change hardware when input circuitry is stressed as a result of a new power source output exceeding the electronic load circuitry input specification and eliminates the need for firmware modifications when an input power source with new linear characteristics is substituted for the original input power source.

Unique to this embodiment is a smart electronic 'active' device used to compare the original input power source characteristics to those expected by the electronic load device that are preferably stored in non-volatile memory. From this comparison, the smart electronic active device controls the smart switched tracking power supply output by duplicating the original power source characteristic. This, in the case of battery technology, permits batteries of different chemistries to be readily interchangeable.

This embodiment comprises a smart controller to monitor the discharge curve of an input power source and translate the output voltage of the smart switched tracking power supply to emulate the discharge curve of a different (second) power source such as, for example, when a battery source of lead acid chemistry is substituted for a battery source having lithium chemistry.

In the above example, the power sources each have different voltage outputs and have different discharge characteristics. In the example, the load electronics are modeled after the original source chemistry and perform power management functions based on the discharge voltage curve of the original source chemistry. If a source having one chemistry is changed to one of a different chemistry, then the discharge input voltage characteristics will be considerably different, making power management functions difficult and unpredictable.

To overcome the above problem, the smart switched tracking power supply digitally translates the new chemistry discharge voltage characteristics to match the original voltage discharge characteristics.

Turning now to FIGS. 2 and 4, a preferred embodiment of the switched tracking power supply of the invention is disclosed.

The smart switched tracking power supply proportionally modifies the switched power supply output to reflect pre-programmed characteristics of power supply input source other than presently used. A specific application example the need to change one battery type from one to another (e.g., for longer operational characteristics), but at the same time keeping the voltage and output voltage variations seen by the load as if it were the battery type that the load was originally designed for.

A design consideration is the selection of the proper feedback gain components to allow power supply output to reflect pre-programmed characteristics of power supply input source as implemented by the smart controller. In this case Vref, typically available from many variable output switched IC devices, is used by the internal switcher circuitry to control PWM duty cycle and thus the output power supply voltage control point. An additional voltage (Vs) derived from the power supply input source may be summed with this Vref control signal to additionally vary the output voltage control point by:

$$Vout = (Vref - Vs)/G0 + Vref \qquad \text{Equ. 1}$$

Vs is defined as a G2 gain addition of the Vref signal and a C1 gain of the input power supply voltage (Vin) by:

$$Vs = -C1*Vin + G2*Vref \text{ (Note: C1 is shown as also a function of G1)} \qquad \text{Equ. 2}$$

By substituting Equ. 2 into Equ. 1 one obtains:

$$Vout = Vref*(1 + 1/G0 - G2/G0) + C1/G0*Vin) \qquad \text{Equ 3}$$

Substitute G0=1 and G2=2
Yields Vout=C1*Vin

Thus, the output of the smart switched tracking power supply modifies the switched supply Vout as a function of the C1 component determined by the input circuitry and the pre-determined memory component as implemented by the smart controller block.

The smart switched tracking power supply comprises a switched power supply having a Vin, a Vref and a Vout.

An input power source such as a battery is in electrical connection with Vin and the input of a first gain function circuit having a gain function G1 and the output of the first gain function circuit is in electrical connection with the input of a smart controller comprising and having smart controller output C1*Vin.

A memory is provided comprising at least one predetermined power source profile in electrical connection with the smart controller. Vref is in electrical connection with the input of a second gain function circuit having a gain function G2.

The output of second gain function circuit summed with the smart controller output to define a first input into third gain function circuit G0. Vref is in electrical connection with a second input to third gain circuit and the output of third gain function circuit G0 in electrical connection with Vout to define an output wherein Vout=(Vref−Vs)/G0−Vref.

The analog embodiment of the smart switched power supply may use either an existing switching power supply device or be implemented with a discrete switching power supply design.

The digital embodiment of the smart switched tracking power supply uses digital conversion of the input power signal with the switching reference signal. The gain, offset and summing calculations may be performed internal to the digital device. The digital device may be implemented as a CPLD, FPGA, DSP, microprocessor or a microcontroller and implemented in combination with selected elements of the analog embodiment.

The analog embodiment of the smart switched tracking power supply may comprise at least one A-D converter, at least one discrete amplifier device; support passive components for filter and gain determination and a boost and/or buck switching power converter module.

The digital hardware implementation may comprise a controller such as an FPGA, DSP, CPLD, microprocessor, or microcontroller memory at least one D-A converter.

Firmware support is preferably used to digitize the input source signal that is compared to stored second source characteristics, and to perform algorithms to generate error signals between the two and to perform an A-D conversion and output signal to analog circuitry.

By implementing this embodiment in a buck/boost switching controller, the smart switching power supply circuitry permits batteries to function above/below the output characterized battery.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

I claim:

1. A smart switched tracking power supply comprising:
a switching power supply having an input voltage, a reference voltage, and an output voltage,
an input power source in electrical connection with the input voltage and the input of a first gain function circuit having a first gain function,
the output of the first gain function circuit in electrical connection with the input of a smart controller comprising and having smart controller output,
a memory comprising at least one predetermined power source profile in electrical connection with the smart controller,
the reference voltage in electrical connection with the input of a second gain function circuit having a second gain function,
the output of the second gain function circuit summed with the smart controller output to define a first input into a third gain function circuit,
the reference voltage in electrical connection with a second input to the third gain circuit,
the output of the third gain function circuit in electrical connection with the output voltage to define a tracking output voltage.

2. A power supply comprising;
an output of a first gain function circuit, the first gain function circuit connected to an input power source,
the first gain function circuit in electrical connection with the input of a smart controller having a smart controller output,
a memory comprising at least one predetermined power source profile in electrical connection with the smart controller,
a voltage reference in electrical connection with the input of a second gain function circuit, and,
the output of the second gain function circuit summed with the smart controller output to define a first input into a third gain function circuit, the voltage reference in electrical connection with a second input to the third gain function circuit.

\* \* \* \* \*